Figure 1:
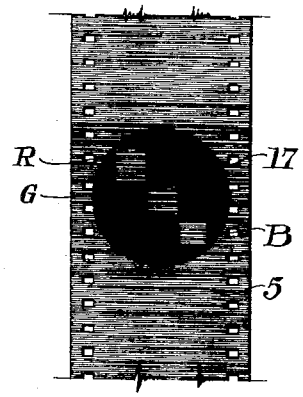

Oct. 9, 1934.  M. W. SEYMOUR  1,976,300
MEANS FOR REPRODUCING COLOR RECORDS
Filed Aug. 1, 1930

Inventor,
Merrill W. Seymour;

By Newton M. Perrins
Attorney.

Patented Oct. 9, 1934

1,976,300

UNITED STATES PATENT OFFICE 1,976,300

MEANS FOR REPRODUCING COLOR RECORDS

Merrill W. Seymour, Rochester, N. Y., assignor to Eastman Kodak Company, Rochester, N. Y., a corporation of New York Application August 1, 1930, Serial No. 472,349

2 Claims. (Cl. 88—24)

This invention relates to color-photography and more particularly to the apparatus for making prints or duplicates on lenticular stock from negative or positive lenticular color films.

It has been found that if the lenticular elements of two superimposed film supports are not in exact registry, moiré patterns, that is, diffraction effects appear. In order to overcome this difficulty, I have discovered in the case of films having cylindrical lenticular elements, that if the film supports are so positioned that the cylindrical elements of one support are at an angle, preferably at a right angle, to the cylindrical elements of the other, these moiré patterns disappear. Thus in printing duplicates from positive or negative film, if the lens elements of the original film extend transversely thereof, the lens elements of the film to be printed should extend longitudinally thereof. This procedure, however, requires an optical system by which the minute transverse photographic elements of the original are translated into minute longitudinal photographic elements on the print.

In the past, the making of duplicates on lenticular film of one size from a negative or positive lenticular film of a different size has involved very careful manipulation. In a reduction printer the two films lie at unequal distances from the optical center, or from the Gauss points, of the lens, and as a result no matter where in the optical system the original film forms the image of the filters, this image subtends a different angle from the point of view of the original film and the printing stock. Assuming parallel lens elements and the same thickness of support on both films, this gives rise to filter images on the emulsion surfaces of the two films which are different in size, and may place undesirable limitations on the optical system employed in taking and projecting the films. In accordance with the present invention, it is proposed to make reduction prints on film stock with cylindrical lens elements at an angle preferably of ninety degrees to those on the original film, by means of an optical printer having incorporated therein a diaphragm provided with apertures spaced appropriately for each film.

The main feature of the invention relates to a novel apparatus for eliminating moiré patterns in pictures printed from an original lenticular film on a second lenticular film. A further feature of the invention relates to a novel diaphragm structure properly positioned in the optical system of a projection printer whereby the undesirable moiré patterns are eliminated. Still another feature of the invention resides in the arrangement whereby prints on lenticular film of one size may be made from a lenticular original film of a different size.

Figure 2:
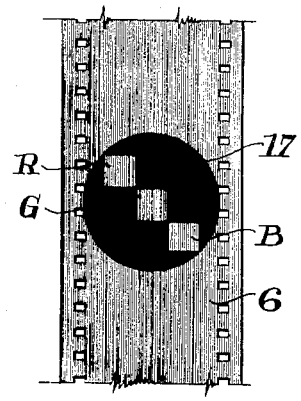
Figure 3:
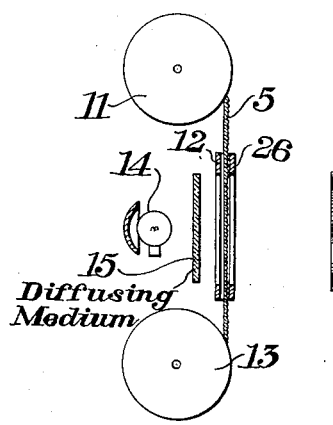
Figure 4:
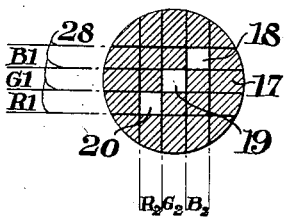
Figure 5:
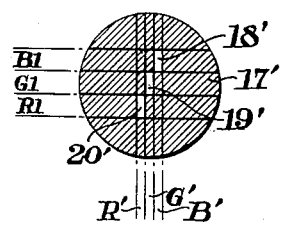

These and other features will appear from the detailed description and claims when taken with the drawing in which Fig. 1 represents a piece of lenticular motion picture film provided with cylindrical lens elements extending transversely thereof showing a projection view of the specially apertured diaphragm of the present invention superimposed thereon; Fig. 2 is a similar strip of lenticular film provided with cylindrical lens elements extending longitudinally thereof together with a projection view of the special diaphragm likewise superimposed thereon; Fig. 3 is a diagrammatic showing of an optical printer in which the film strips of Figs. 1 and 2 may be utilized; Fig. 4 is a diagram indicating how the shape and position of the apertures in the diaphragm are developed; while Fig. 5 is a similar diagram showing how the arrangement and position of the apertures for printing from lenticular film of one size to a lenticular film of a different size is determined.

It has been noted that when an original lenticular film 5 bearing either a negative or other original photographic record made according to the process disclosed in the patent to Berthon, #992,151, granted May 16, 1911, is printed on a second lenticular film on which the microscopic lens elements thereof extend in the same direction as the corresponding elements of the original film, undesirable moiré patterns may result. In accordance with the present invention, it is, therefore, proposed in making prints from an original on a second film, to employ a lenticular film 6 such as shown in Fig. 2 with the microscopic lens elements extending longitudinally thereof. It will be understood, however, that if the lens elements on the original film extend longitudinally thereof the corresponding lens elements on the film to be printed should extend transversely thereof. The elimination of the moiré patterns may, however, be effected with any other arrangement of the cylindrical lens elements on the original film and film to be printed provided that these lens elements of the two films are positioned at an angle to each other.

In making a print on the film 6 from the original film 5, an optical or projection printer of the type diagrammatically represented in Fig. 3, is employed. In such a printer, the original film 5 or other picture record represented as having horizontal lens elements is moved a frame at a time by well-known pull down mechanism (not shown) from a supply reel 11 through the gate structure 12 to a take up reel 13. This gate has a window 26 which is illuminated from the light source 14 through the plate 15 of opal glass or other diffusing medium. The film 6 to be printed, which is assumed to have vertically extending lens elements, is moved in synchronism with film 5 from a supply reel 24 past the window 27 in gate structure 22 by well-known pull down mechanism (not shown) to a supply reel 25. The optical system of the printer comprises the objectives 16 and 21 which are placed with their axes in common between the windows 26 and 27 in the gates 12 and 22. The objectives 16 and 21 are substantially similar in construction and each has a focal length and aperture suitable for the taking of pictures, in accordance with the above-mentioned process. There is positioned intermediate of these objectives a diaphragm 17 having apertures 18, 19 and 20 as indicated in Fig. 4. The shape and position of these apertures in the diaphragm is determined by drawing parallel lines 28 to mark the boundaries of the aerial images corresponding to the color bands R1, G1, B1 of the original taking filter, when film 5 is projected through the lens elements 16. Similar vertical parallel lines are drawn parallel to the embossed longitudinal lenses on film 6 thereby forming three vertical bands designated R2, G2, B2, corresponding to the color bands of the original taking filter. The areas that are common to bands R1, R2, G1, G2, and B1 and B2 are left clear and the other areas are blocked off by the diaphragm. A diaphragm thus constructed enables the color records on original film such as 5 to be registered properly on the printing stock or film such as 6.

In the operation of the printer, the pull down mechanisms thereof advance the films 5 and 6 synchronously a frame at a time to position successive frames of these films before the windows in the gates 12 and 22. As the diffused light from the sources 14 passes through the original film 5 the lens elements thereof form three horizontal bands B1, G1, and R1 corresponding to the three color bands of the filter through which the picture record on the original film 5 was originally taken. It will be noted by reference to Fig. 4 that the apertures 18, 19 and 20 are displaced perpendicular to the direction in which the cylindrical elements extend on both of the films 5 and 6. In this way light rays through the film 5 representing the form and color values of the picture on the original film are separated in one direction with respect to the color values which they represent, and the apertures 18, 19 and 20 of the diaphragm also separate these rays in an additional direction so that the longitudinal, embossed lens elements on the film 6 can receive them through the lens unit 21 and form microscopic images on the film 6 which images are perpendicular to the corresponding microscopic images on the original film 5.

The optical printer of Fig. 3 may also be used in printing a lenticular film 6 of one size from an original lenticular film 5 of a different size, for example, the original picture may be recorded on 35 millimeter film having horizontal lens elements onto 16 millimeter film have vertical or longitudinal lens elements. In effecting such printing operation, the diaphragm 17' with apertures 18', 19', and 20' is substituted for the diaphragm 17 represented in Fig. 4. In this instance the length of the apertures 18', 19' and 20' is proportional to larger sized film, while the width of these apertures is proportional to the smaller sized film, as indicated at R', G', and B'.

The theory of this projection printer may be briefly described as follows. There has been formed in the original film a series of three constantly varying linear images behind each lenticular element, as described for instance in the patent to Capstaff, 1,687,055, granted October 9, 1928, these being the images, made by the cylindrical lenses, of a three banded diaphragm as viewed from the various points of the exposure field. In projection, the cylindrical lens in turn project these linear images back to the plane of the diaphragm which must of course be situated in the projection system in the same optical position as in the camera. When a print is made by projection, as in the present instrument, the lenticulations on the sensitive film 6 again image the diaphragm, as illuminated by the images projected from the image bearing film 5. There are two complete optical systems each comprising a lenticulated film, a complete objective and the diaphragm, the latter being common to both systems and being at the plane of the aerial image. The diaphragm 17 is positioned in such an optical position in each system that the one set of lenticulations will project an aerial image in focus in its plane, and the other set of lenticulations will image this aerial image in focus in the sensitive emulsion of film 6.

If the two sets of lenticulations are parallel there is almost unavoidably present overlapping fringes or bands producing the undesired "moiré" effect. This difficulty is here overcome by utilizing only those portions of the image bands projected on the diaphragm plane, which are common to the corresponding color bands of the two systems. Since the lenticulations are cylindrical, there is no loss of image detail but only of amount of light. Since this is a printing system this loss is not of importance since it may be easily compensated for in the time of exposure.

What I claim is:

1. A projection printer for printing from an original film of a definite width and having linear lenticulations on its surface upon a second film of a different width and having linear lenticulations positioned, when in the printer, at an angle to those on the first film, said printer comprising two windows, means adapted to guide and feed the films intermittently and synchronously past said windows, means to illuminate that window past which the original film is fed, an optical system for projecting images from one window to the other and comprising two objectives and a diaphragm between the objectives, the diaphragm having a series of quadrilateral apertures with parallel sides, positioned along a line diagonal to the direction of the lenticulations in both films, the proportions of the sides of the apertures being those of the width of the film.

2. In a projection printer, a gate for supporting a film of a determined width and having linear lenticulations, a second gate for supporting a film of a different definite width also having linear lenticulations with the lenticulations at an angle to the first, an optical system for projecting images from one gate to the other and comprising two objectives and a diaphragm between the objectives, the diaphragm having a series of rectangular apertures positioned along a line diagonal to the direction of the lenticulations in both films, the proportions of the rectangles being those of the films.

MERRILL W. SEYMOUR.